Figure 1:
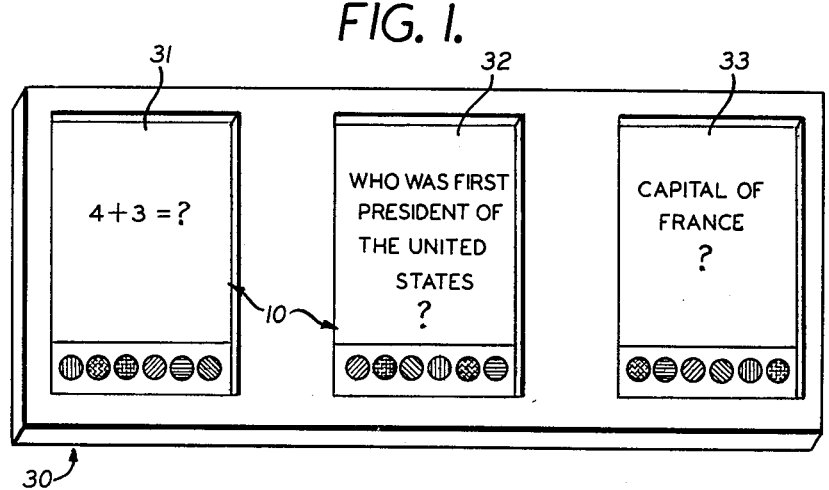

Nov. 3, 1964  F. B. LA PRELLE  3,154,863
TEACHING MEANS
Filed Dec. 18, 1962

INVENTOR
FRANK B. LA PRELLE
BY *Robert W. Siddler*
ATTORNEY.

United States Patent Office 3,154,863
Patented Nov. 3, 1964

3,154,863
TEACHING MEANS
Frank B. La Prelle, New York, N.Y., assignor to Ed-U-Cards Manufacturing Corporation, Long Island City, N.Y., a corporation of New York
Filed Dec. 18, 1962, Ser. No. 245,504
3 Claims. (Cl. 35—9)

Contemporary teaching techniques have given rise to a variety of new developments implementing the transmission of information to the student in a fashion such as to emphasize and reinforce the learned information. It is found that if the student is required to select a correct answer in response to a given posed question, and is further required to check in some way on the correctness of this answer that the information transferred by the question and answer is reinforced in the mind of the student and retained. It is further found desirable to present the information graphically, since apparently the graphic presentation impinging upon the visual senses provides for greater awareness and retention of the taught subject matter.

Thus a variety of teaching aids have been evolved employing a graphic presentation of desired information. Such devices as flash cards, or the like have long been employed as a teaching aid. In utilizing devices such as flash cards to aid in graphic presentation of taught material, the presence of the teacher is required in order to determine whether the information desired to be elicited by any given flash card is properly responded to by the student. Where the student attempts to employ the flash cards without the aid of a teacher, a determination of the correctness of any answer to any question posed becomes unwieldly.

It is accordingly with the above problems and desiderata in mind, that the present means have been evolved, means including both method and apparatus implementing the graphic presentation of information by posing questions, and eliciting correct answers in response thereto. The student or recipient of the desired information is placed in a position to check for himself the propriety of any given answer offered in response to the posed question.

It is accordingly a primary object of this invention to provide improved educational means implementing the transmission of information in a question and answer form.

Another object of the invention is to provide improved educational means implementing the graphic presentation of information.

It is a further object of the invention to provide improved teaching means serving to permit the imparting of information in a question and answer form, in which the correctness of any answer is subject to checking by the answerer.

It is also an important object of the invention to provide improved teaching means permitting the student to obtain desired information without the aid of a teacher.

These and other objects of the invention which will become hereafter apparent are attained by providing teaching means including a graphically presented question. It is preferred that the graphically presented question be imprinted on an indicia bearing area of a card or the like sheet material subject to ready manipulation. Arranged adjacent the given question are key means in the form of a plurality of different colored markings such as colored dots or the like. On a separate card preferably of a size like that of the question bearing card of an area and shape congruent therewith, an answer is imprinted. Adjacent the imprinted answer are code means cooperating with said key means to indicate the propriety of any given answer with which said code means are associated as a response to the question posed on the question card. These code means are preferably in the form of a hole aligned with a colored dot on the key means of the question card, the colored dot with which it is aligned being known in advance to indicate the correctness of an answer. A feature of the invention resides in the fact that a wide range of possible answers may be indicated as possibly permissible. This is accomplished by employing different shades of the same color in connection with the key means. Thus for example in addition to yellow, blue and green dots, red dots in varying shades may be provided on the key means, and apertures on the answer cards may be provided aligned with different shades of these red dots dependent on the correctness of the answer so that the preferred answer will have the hole aligned with the brightest red dot while the less preferred answers will have a hole aligned with the lighter shades of red in the key of the question card.

Figure 2:
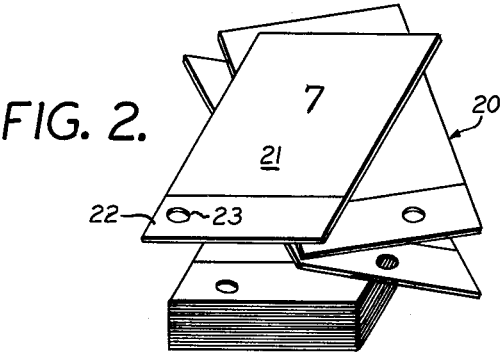
Figure 3:
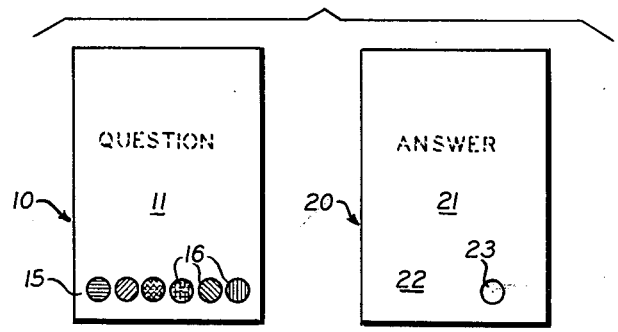

The specific details of a preferred embodiment of the invention, and their mode of functioning will be made most manifest, and particularly pointed out in clear, concise and exact terms in conjunction with the accompanying illustrative drawings, wherein:

FIG. 1 is a perspective view of a tray designed to support a plurality of question cards upon which the desired answer cards may be superimposed; and FIG. 2 is a perspective view of a group of answer cards showing the code means associated therewith; and FIG. 3 is a top plan view indicating the relationship between a question card and an answer card embodying the instant inventive concept.

As best seen in the drawings, the invention has been here shown as embodied in connection with a series of cards subject to ready manipulation. These cards are of a type and size similar to playing cards or the like with a dimension between two and five inches in width, and between five and ten inches in length. Cards of this range of dimension are generally found most suitable for easy handling.

Each question card 10 as best seen in FIGS. 1 and 3 is formed with an indicia bearing area 11 upon which the desired question is imprinted or otherwise graphically presented. Adjacent the question area 11, a key area 15 is formed containing a plurality of keys 16 in the form of colored dots.

An answer card as best seen in FIGS. 2 and 3 is formed on sheet stock similar to the question card and is provided of a size having an area congruent with that of the question card. The answer card 20 is formed with an indicia bearing area 21 upon which a given answer may be graphically imprinted or otherwise superimposed. Adjacent the answer area 21 is a code area 22 having a code formed therein in the form of a hole 23.

It will be noted that whereas the question card is formed with a plurality of differently colored key dots, the answer card 20 is formed with only a single code aperture 23. The code aperture 23 is aligned with a colored dot 16 in the key area 15 of the question card having a color which has been preselected to indicate the correct answer. Those answer cards containing an answer which is partially correct in response to any given question posed on a question card will have code hole 23 arranged for alignment with a different or lighter shade of the prearranged correct color.

In the illustrated preferred structural embodiment of the invention, a holder in the form of a tray 30 is provided containing a plurality of recessed panels, three of which are here shown as 31, 32 and 33, of a size adapted to receive the question cards 10 and answer cards 20.

Operation

The invention has been here disclosed as embodied in connection with a series of cards subject to ready manipulation, it will however be apparent to those skilled in the art that the inventive concept may readily be employed in connection with a variety of different shapes or structures adapted to have questions graphically imprinted thereon and answers graphically imprinted thereon.

Use of the illustrated cards may be implemented by use of tray 30 having panels 31, 32 and 33. The panels of tray 30 are filled with question cards 10 as illustrated in FIG. 1. Thereafter the stack of answer cards as illustrated in FIG. 2 is held by the student and turned over one at a time until he believes he has in his hand a card bearing a correct answer in response to one of the questions posed on the exposed cards on tray 30. This supposedly correct answer is then superimposed over the question which it is regarded as a response to. If the answer on the selected answer card 20 is indeed correct as supposed by the student, then the colored key dot exposed through the code hole 23 of the selected answer card 20 will be of the preselected color indicating a correct answer.

In order to avoid any possibility of the student learning to identify the correct answers in response to location of the code hole 23, it is proposed that the correct color dot be located in a different position on the different question cards. Thus whereas the correct dot is shown at the extreme left in panel 31, the correct dot at the extreme right will appear at the fourth from the left in panel 32, or at the fifth from the left in panel 33.

In the event that an incorrect answer card 20 has been selected by the student, the color showing through the code hole 23 will be other than that of the preselected correct color. In connection with those questions which may have a multiplicity of answers, some of which are more correct than the others, as heretofore described, the question card may be provided with a series of different shades of the preselected correct color, and the less correct answers may reveal a different shade, preferably lighter than that of the correct answer card.

It is thus seen that simple, effective teaching means have been provided for graphically presenting to a student information by posing questions and eliciting answers in response thereto. The correctness of any given answer offered by the student as a response to the question is determined by the key of the question revealed by the code of the answer bearing card thus enabling the student to check on himself without requiring a third party such as a teacher or the like to aid in determining correctness of any given selected answer.

The above disclosure has been given by way of illustration and elucidation and not by way of limitation, and it is desired to protect all embodiments of the herein-disclosed inventive concept within the scope of the appended claims.

What is claimed is:

1. A method of teaching comprising the steps of: graphically presenting a question; applying a plurality of differently colored key markings adjacent the question; providing a number of graphic answers, not all of which are a correct response to the question; applying a code to each of said answers by forming an opening in an area adjacent the correct answer through which one of said colored markings is visible, a pre-selected color being visible only through the opening of the correct answer, said key formed with lighter shade markings of the pre-selected color; and said code openings exposing these lighter shade markings on answer cards containing a partially correct answer.

2. A teaching device comprising: a question member; a question area on said question member; a key area on said member containing a plurality of differently colored key marks, including some marks of different shades of a pre-selected color; an answer member; an answer area on said answer member; and a code area on said answer member adapted for positioning with respect to said key area on said question member, said code area containing openings revealing a pre-selected color of the key area on the question member when the correct answer member is selected, whereby depending on the key matched by said code area the propriety of the answer on the answer area may be determined and partially correct answers may be indicated.

3. A set of teaching cards comprising: a plurality of question cards having question posing indicia on a question area thereof; a key area on said question cards, said key area having a plurality of key indicia formed thereon by a plurality of differently colored elements, some of which are of different shades of a single color; a plurality of answer cards having answer indicia on an answer area thereof, said answer indicia responsive with a varying degree of correctness to the questions posed on said question cards; and a code area on said answer cards, said code area having openings matching with at least one of said key indicia and indicating, depending on the key indicia with which matched the correctness of the answer to the question, whereby a partially corect answer may be indicated.

References Cited in the file of this patent

UNITED STATES PATENTS

| 1,745,946 | Murray | Feb. 4, 1930 |
| 2,138,524 | Harkins | Nov. 29, 1938 |
| 2,652,635 | Conger | Sept. 22, 1953 |
| 3,024,541 | Byrum | Mar. 13, 1962 |